United States Patent [19]

Keenan et al.

[11] Patent Number: 4,676,661

[45] Date of Patent: Jun. 30, 1987

[54] RADIOACTIVE TIMING SOURCE FOR HOROLOGIC INSTRUMENTS AND THE LIKE

[75] Inventors: Joseph A. Keenan, Richardson; Alan R. Reinberg, Dallas, both of Tex.

[73] Assignee: Texas Instruments Incorporated, Dallas, Tex.

[21] Appl. No.: 890,732

[22] Filed: Mar. 27, 1978

Related U.S. Application Data

[63] Continuation of Ser. No. 702,799, Jul. 6, 1976, abandoned.

[51] Int. Cl.[4] .......... G04F 5/00; G01T 1/24

[52] U.S. Cl. .......... 368/156; 357/29

[58] Field of Search .......... 58/23 R, 23 A, 23 AC, 58/23 C; 357/29; 368/155, 156; 310/303

[56] References Cited

U.S. PATENT DOCUMENTS 3,257,570 6/1966 Dehmelt et al. .......... 310/303

3,724,201 4/1973 Bergey .......... 58/50 R

FOREIGN PATENT DOCUMENTS 2401560 8/1974 Fed. Rep. of Germany .......... 357/29

1443434 7/1976 United Kingdom .

*Primary Examiner*—Vit W. Miska

*Attorney, Agent, or Firm*—William E. Hiller; James T. Comfort; Melvin Sharp

[57] ABSTRACT

The randomly-generated energy produced by decay of a radioactive source is utilized to generate timing signals for horologic and chronographic instruments such as electronic watches, clocks or chronometers. The radioactive source is implanted by ion implantation or diffusion in or near the depletion region of a P-N junction semiconductor device which may be integrated on a common semiconductor substrate with the electronic timekeeping circuitry of the horologic or chronographic instruments. Individual pulses due to beta radiation produced in the depletion region causes electron migration from the P to the N region of the device and produces electrical pulses. These pulses are amplified and counted until a preselected count is reached. When such count is reached, the timekeeping circuitry is stepped by one second or some convenient fraction thereof.

1 Claim, 5 Drawing Figures

RADIOACTIVE TIMING SOURCE FOR HOROLOGIC INSTRUMENTS AND THE LIKE

This is a continuation of application Ser. No. 702,799, filed July 6, 1976, now abandoned.

BACKGROUND OF THE INVENTION

This invention relates to horologic instruments and, more particularly, to horologic and chronographic instruments, such as electronic watches and the like, which utilize random timing sources.

Timing sources, such as quartz crystal oscillator circuits, have been widely used in electronic watches and other horologic instruments. The quartz crystals are accurate in producing pulses which are precisely separated in time. The pulses are then counted to generate timekeeping signals which are one second or some other desired fraction of a second apart. The timekeeping signals are then typically utilized to advance an additional set of counters, the output of which drives a display means which indicates relative time, lapsed time or the like. The quartz crystals which are mechanically cut are not identical, and the oscillator circuits do require adjustment; therefore, only a limited but highly acceptable degree of accuracy is attained. Certainly, for applications such as electronic watches, no greater degree of accuracy and, in most instances, a lesser degree of accuracy, is acceptable to the user. On the other hand, quartz crystals are relatively expensive, and it is highly desirable to eliminate this element from electronic watches and other horologic instruments while still providing an acceptable degree of accuracy.

One suggested solution to elimianting the quartz crystal is to replace the quartz crystal oscillator circuits with R-C oscillator circuits. These circuits, although tunable to produce pulses which are precisely separated over a short time period, are very temperature dependent; therefore, an acceptable degree of accuracy is not presently attainable utilizing this approach.

It is, therefore, an object of the present invention to provide improved horologic and chronographic instruments such as electronic watches and the like.

It is another object of the invention to provide electronic watches and other horologic and chronographic instruments which do not require quartz crystals or R-C oscillator circuits as timing sources.

It is still a further object of the invention to provide low-cost electronic horologic and chronographic instruments such as electronic watches and the like.

BRIEF DESCRIPTION OF THE INVENTION

These and other objects are accomplished in accordance with the present invention in which horologic and chronographic instruments, such as electronic watches, chronometers and the like, utilize randomly-generated energy to produce electrical pulses in synchronism with the generated energy. This generated energy, such as noise, although random over a short time, has an average rate over a long time interval that follows well-established statistics to provide the horologic instruments with a highly acceptable degree of accuracy. The randomly-generated energy is utilized to produce electrical pulses in synchronism therewith; such electrical pulses are amplified and counted until a predetermined count is reached. When this occurs, the time-keeping or other circuitry is stepped by a unit of time such as one second or some other convenient fraction thereof. In a preferred embodiment, the randomly-generated energy is produced by a beta-emitting ($\beta$) radioactive source. The radioactive source is, for example, ion implanted in or near the depletion region of a P-N semiconductor junction, preferably in the same semiconductor chip as the electronic timekeeping circuitry.

BRIEF DESCRIPTION OF THE DRAWINGS

Still further objects and advantages of the invention will become apparent from the detailed description and claims and from the accompanying drawings in which:

BRIEF DESCRIPTION OF THE PREFERRED EMBODIMENT

Figure 1:
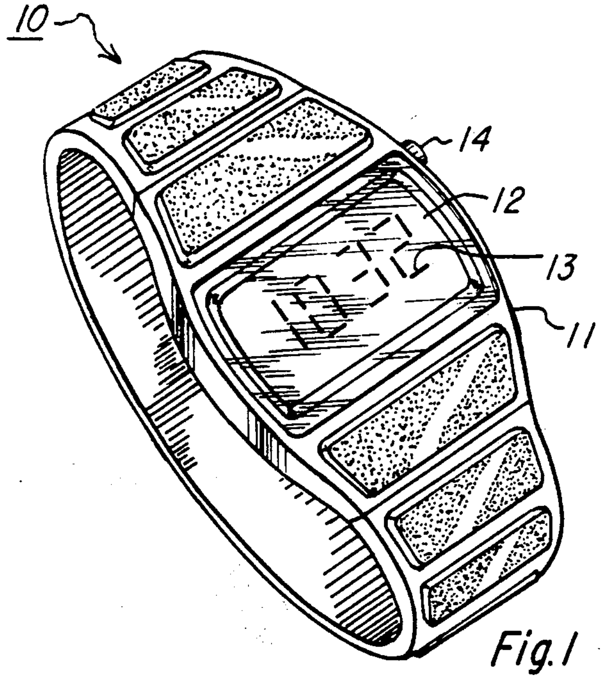
FIG. 1 is a perspective view of an electronic watch embodying the present invention.

Referring then to FIG. 1, an electronic watch 10 embodying the present invention is shown. Watch 10 is comprised of a housing 11 which encases the timing source, timekeeping and/or chronographic circuitry, power source, such as miniature batteries and/or solar cells and a display for indicating relative time (day, date, hours, minutes, seconds and/or fractions of seconds). In the embodiment of FIG. 1, a digital display 13 is shown visible through lens member 12. Where the display is comprised of light-emitting elements such as LED's, one or more switches, such as switch 14, are utilized to energize the display and/or select a particular time or chronographic function to be displayed; lens member 12 is utilized as a filter. In the example of a liquid crystal or other passive display, a demand switch is not required for energization of the display, although, in embodiments where multiple functions are desired, one or more switches, such as switch 14, are utilized to select between the various functions to be displayed; a filter is not generally required.

Figure 2:
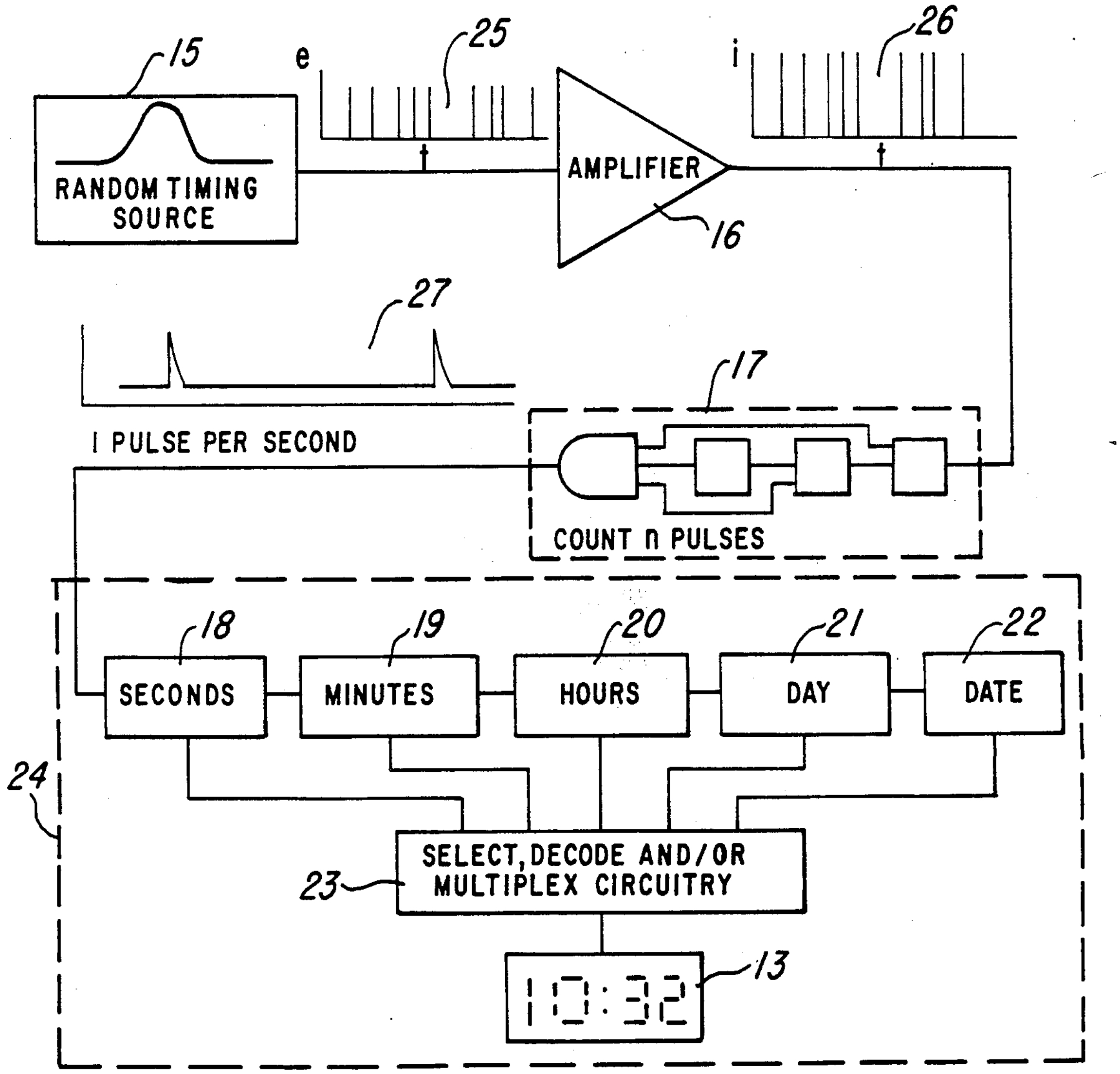
FIG. 2 is a block diagram of the logic circuitry comprising electronic watch of FIG. 1.

Referring now to FIG. 2, a block diagram of the circuitry of one electronic watch embodying the present invention is shown. The system includes a random timing source 15 which produces electric pulses 25 (shown a voltage "e" as a function of time "t" from a source of randomly-generated energy in synchronism with the generated energy. Electric pulses 25, although random over a short time period, have an average rate over a long time period that follows well-established statistics. Electrical pulses 25, which may be on the order of pico amperes, are then amplified by amplifier circuit 16 to provide the particular pulse shape, current ("i") and voltage levels (pulses 26) required for interfacing with bipolar, $I^2L$, MOS, CMS or other circuitry, depending upon the particular embodiment desired.

Since electrical pulses 25 and 26, over a long time period, have a very predictable average rate, that average rate is utilized to establish a timing signal 27. For example, if n pulses are generated, on the average, in one second, then a count to n counter 17 is coupled to the output of amplifier 16 to count the generated pulses 27. Counter 17 thus produces one pulse 27 approximately every second. These pulses are then counted in additional counters, i.e. 18–22, as desired, to provide seconds, minutes, hours, day, and/or date and may also be utilized for counting lapsed time, etc, as is well known in the art. The outputs of counters 18–22 are coupled to display 13 by means of select, decode and/or multiplex circuits 14, all of which are well known in the art. Select circuit means is typically utilized, for example, where a limited number of display digits are to be shared by a respectively larger number of counters to selectively display different quantities at different times. The selections are typically controlled by switch 14 as previously described with respect to FIG. 1. A decoder is typically utilized to provide proper signals to interface with the particular type of display employed, for example, seven segment, eight segment, dot matrix, etc. Multiplexers are typically utilized to provide energization to the digits of the display in a predetermined sequence to reduce the number of interconnections required between the counters 18–22 and the display elements of display 13.

Timekeeping circuitry 24 may be, for example, of current injection logic ($I^2L$) an example of which is described in U.S. Pat. No. 3,886,726. Thus, random timing source 15 amplifier circuit 16 and counter 17 embodied in the present invention may replace the quartz crystal oscillator and frequency divider of the above referenced patent and additional counters 18–22, display means 13 and interface circuitry 23 could be the same as the respective counters, display means and detector/driver interface circuitry described in such patent.

In a preferred embodiment of the present invention, the randomly-generated energy is provided by a beta-emitting radioactive source such as carbon 14 ($^{14}C$) or tritium ($^3H$). Both of these sources generate soft beta radiation and do not emit any harmful gamma radiation. The emitted beta radiation is detected by a P-N junction semiconductor device 36, such as that illustrated in FIG. 3. P-N junction device 36 is preferably formed on the same semiconductor substrate as amplifier circuit 16 and, preferably on the same substrate as counter 17 and the remainder of timekeeping circuitry to provide a totally integrated system.

Figure 3:
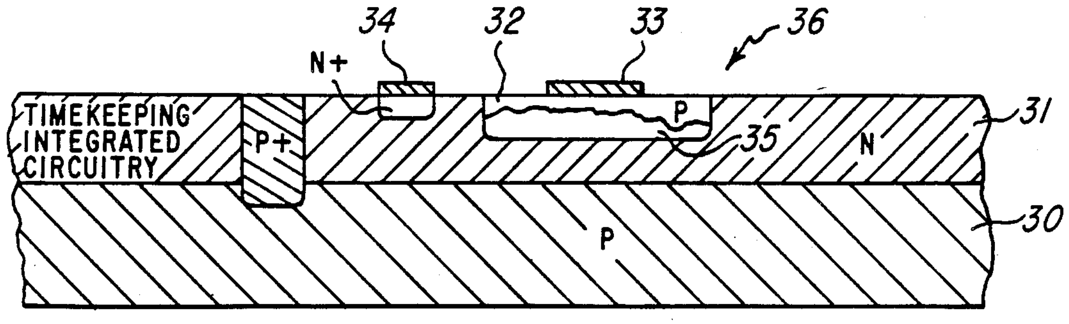
FIG. 3 is a cross-sectional view of a P-N junction having an ion-implanted radioactive species in the depletion region thereof to produce electrical pulses in synchronism with the generated energy.

Referring then to FIG. 3, a P-type semiconductor substrate 30 is shown on which an N-type epitaxial layer 31, for example, between about 0.3–1.0 ohm-cm in thickness. A P region 32 is then formed, typically by diffusion, in epitaxial layer 31 to provide the P-N junction. Contact means 33 and 34 are formed to provide interconnections between the P and N regions of the device and the other timekeeping circuitry which is preferably fabricated on the same substrate 30. A radioactive region 35 is formed in or near the depletion region of the P-N junction, preferably by ion implantation, a well known technique. Diffusion, an equally well-know semiconductor fabrication technique, may also be utilized to form the radioactive region 35. The radioactive region is preferably formed in P region 32, for the highest degree of efficiency of emitted beta radiation; the emitted beta radiation (electrons) causes electron migration from P region 32 to the N region 31. This migration of electrons causes electrical pulses to be generated in synchronism with the generated beta energy. The use of a radioactive region formed in the depletion region of a P-N junction has been suggested in U.S. Pat. No. 3,257,570, for the purpose of providing a power source. The radioactive diode described in that patent is a grown junction device in which the radioactive source has been grown into the junction region. This technique of fabricating a semiconductor power source has not been commercially sucessful because an insufficient amount of energy is produced for that purpose. However, in accordance with the present invention, a small amount of radioactive material implanted or diffused in or near the depletion region of a P-N junction device of an integrated circuit is sufficient to generate pulses which are detectible and which may be utilized to provide a timing source for horologic instruments. In order to best understand the system of the present invention, examples of timing sources utilizing carbon 14 and tritium will henceforth be described in detail. The beta radiation generated by these sources may be considered as following a Poisson distribution according to the equation shown in TABLE I. Assuming that an acceptable degree of accuracy for an electronic watch embodied in the present invention is about 20 seconds per month, this accuracy can be attained where the number of counts per month equal $1.77\times10^{10}$, which , as can be seen from TABLE I, is provided by a count of $6.5\times10^3$ pulses per second. Also, since the standard deviation is proportional to the square root of the average value of P, the accuracy of such timepiece, over a period of a year, is about one minute (69.5 seconds), a highly acceptable degree of accuracy which favorably compares with the degree of accuracy available form watches currently being marketed which utilized quartz-crystal timing sources.

The total number of nuclei at the end of the useful life of the radioactive source:

$$N = \frac{R \times t_{\frac{1}{2}}}{0.695} \qquad (1)$$

Where

R = the number of disintegrations per second and $t_{\frac{1}{2}}$ is the half-life of the radioactive source.

An example of a timing source utilizing tritium as the radioactive material will first be described. The half-life for tritium is 12.26 years or $3.862\times10^8$ seconds. The betaemission is at 15.9 keV max. The total number of radioactive nuclei at the end of the useful life of tritium is, therefore, $N_{final}=3.62\times10^{12}$ atoms. The total number of radioactive nuclei at the end of the useful life is about one-half the initial number of radioactive nuclei, tritium having a useful life of approximately 12 years. Thus, in a preferred embodiment of the invention, some other digital logic means may be utilized to compensate for the variance in the rate of beta-emission caused by radioactive decay as will later be discussed with respect to FIG. 5.

TABLE I

TIME DEVIATION.

Counting Statistics

Poisson Distribution $$P(k) = \frac{a^k e^{-a}}{k!}$$

$\langle P \rangle = a$ average value of P $\sigma = \sqrt{a}$ standard deviation Example Rate = $6.5 \times 10^3$ counts/sec

| Units of Time | No. of Counts | $\sigma$ (counts) | $\Delta^t$ (sec) |
|---|---|---|---|
| 1 sec | $6.5 \times 10^3$ | 81 | $1.2 \times 10^{-2}$ |
| 1 min | $3.9 \times 10^5$ | $6.24 \times 10^2$ | $9.6 \times 10^{-2}$ |
| 1 hour | $2.34 \times 10^7$ | $4.84 \times 10^3$ | 0.74 |
| 1 day | $5.62 \times 10^8$ | $2.37 \times 10^4$ | 3.65 |
| 1 week | $3.93 \times 10^9$ | $6.27 \times 10^4$ | 9.65 |
| 1 month (4.5 wk) | $1.77 \times 10^{10}$ | $1.33 \times 10^5$ | 20.5 |
| 1 year | $2.04 \times 10^{11}$ | $4.52 \times 10^5$ | 69.5 |

At an implant density of $2\times10^{15}/cm^2$, the area required for the tritium diode is $1.8\times10^{-3}/cm^2$ or $0.0167''\times0.0167''$. The charge Q produced by the beta-emission in the tritium diode is approximately $2.49\times10^{-16}$ coulombs. The capacitance of the diode is approximately $8.76\times10^{-12}$ farads or 8.76 pF and the input impedance is less than $1.14$–$10^6$ ohms. The tritium diode thus provides a pulse current of approximately 25 pico amperes.

The half-life for carbon 14 is $5.73\times10^3$ years or $1.805\times10^{11}$ sec. The beta emission is at 159 keV max. The total number of radioactive nuclei at the end of the useful life of carbon 14 is, according to equation (1), $N_{final}=1.69\times10^{15}$ atoms. The total number of radioactive nuclei at the end of the useful life is approximately equal to the initial number of radioactive nuclei, carbon 14 having a useful life of well over a hundred years. Even though carbon 14 has a much greater half life than tritium, it is still preferable to provide some additional digital logic means associated with the timekeeping circuitry to compensate for the variance in the rate of beta emissions caused by radioactive decay as will be discussed later with respect to FIG. 5.

Figure 4:
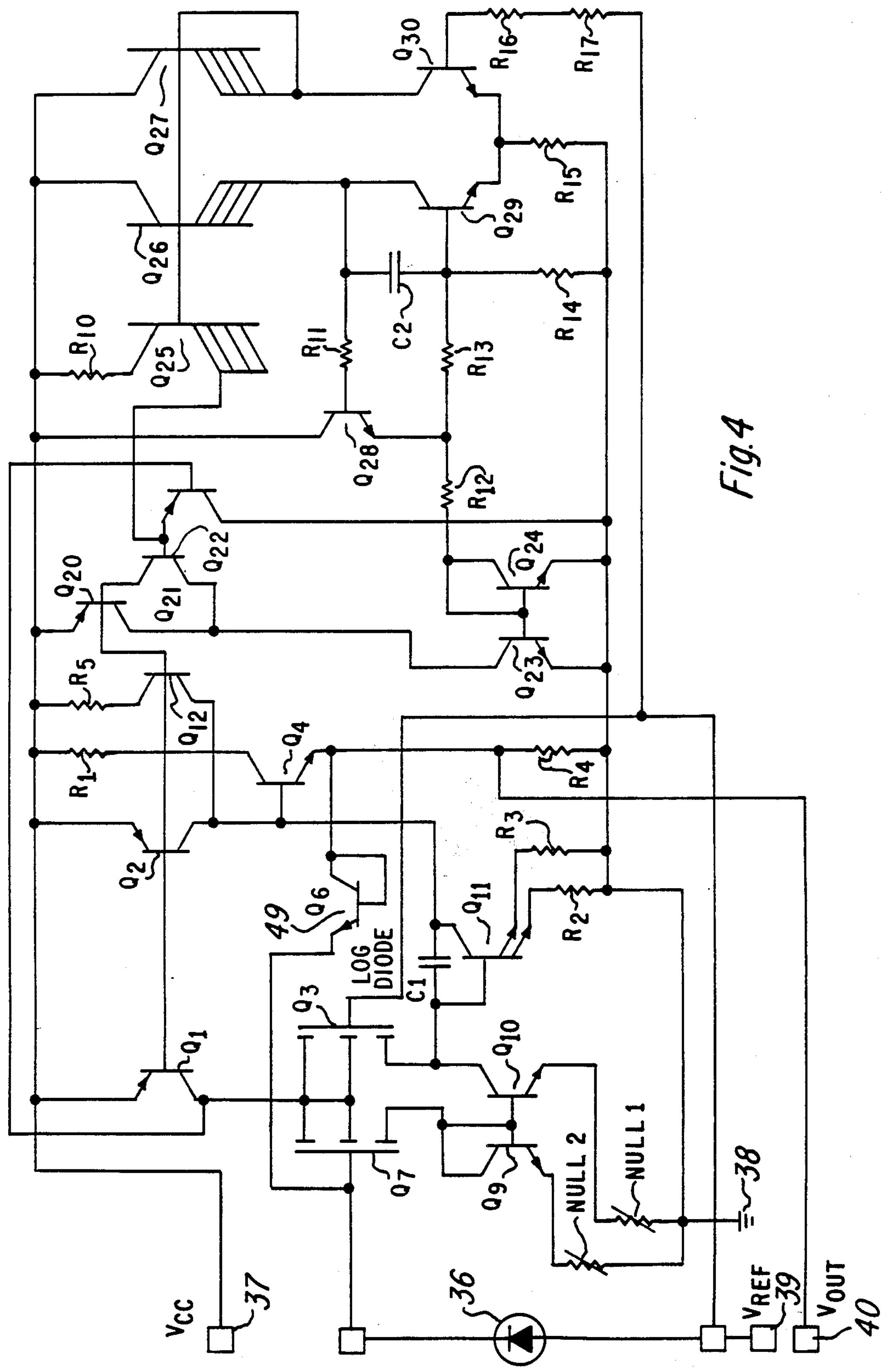
FIG. 4 is a schematic diagram of an amplifier circuit for amplifying the electrical pulses to provide an input signal to the timekeeping circuitry.

At an implant density of $2\times10^{15}/cm^2$, the area required for the carbon 14 diode is 0.85 $cm^2$ or $0.362''\times0.362''$. The charge Q produced by the beta emission in the carbon 14 diode is approximately $2.49\times10^{-15}$ coulombs. The capacitance of the diode is approximately $4.1\times10^3$ pF and the input impedance is less than $2.4\times10^3$ ohms. The carbon 14 diode thus provides a pulse current of approximately 250 pA. Referring to FIG. 4, an example of a bipolar amplifier circuit (transistors Q3 and Q7) with an MOS input circuit is shown. The amplifier circuit of FIG. 4 may be utilized with radioactive diode 36 utilizing either the tritium or carbon 14 as discussed above. The amplifier of FIG. 4 utilizes a transistor means Q6 connected to provide log diode 37 have the logarithmic response of a diode without the parasitic losses associated therewith at the low power levels. The amplifier is therefore capable of detecting pulses at a current output level as low as 3 pA. The amplifier uses an operating voltage of, for example, 3 volts applied between $V_{cc}$ terminal 37 and ground terminal 38 and a reference voltage of, for example, 1.2 volts applied to $V_{REF}$ *terminal* 39. *The output pulses provided at* $V_{out}$ terminal 40 are compatible with $I^2L$ logic circuitry of the type utilized in the above referenced U.S. Pat. No. 3,886,726. Amplifier circuits similar to the type illustrated in FIG. 4 with transistor means $Q_1$–$Q_{30}$, resistors $R_1$–$R_5$ and $R_{10}$–$R_{17}$, capacitors $C_1$ and $C_2$, and variable resistors $NULL_1$ and $NULL_2$. have been utilized commercially in cameras and the like where electrical signals in the picoampere range produced by photodiodes are amplified and utilized to control the exposure and operation of the camera.

In embodiments which utilize radioactive energy as the random timing source, a problem arises; in that, as the radioactive source decays, the average rate of the generated energy decreases exponentially with respect to time. Thus, the average number of pulses per unit of time, which are counted to determine the lapse of such unit of time, is constantly decreasing over the lifetime of the radioactive energy source. One method of compensating for this change in rate is illustrated in FIG. 5.

Figure 5:
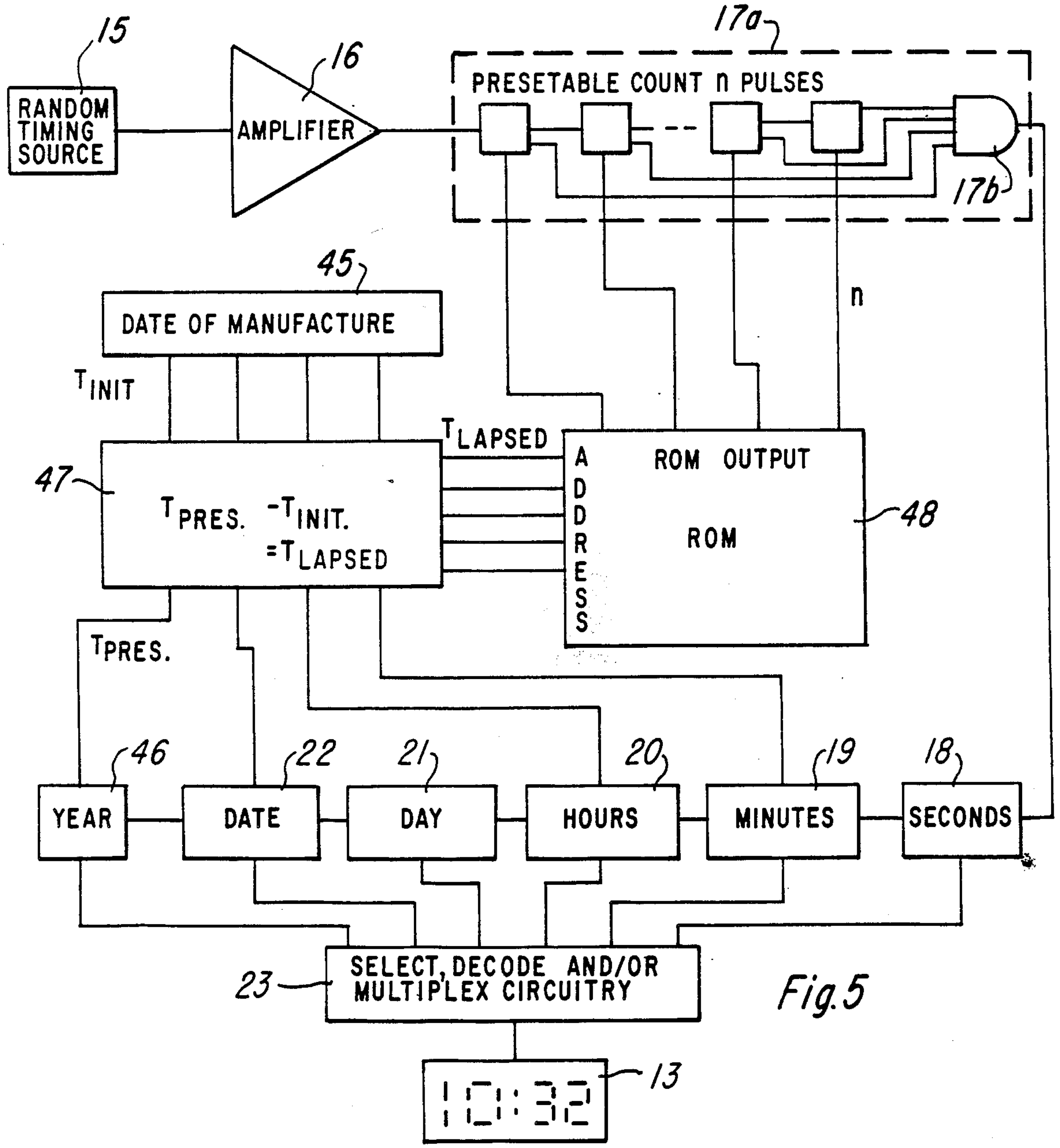
FIG. 5 is a logic diagram of an embodiment of the electronic watch of FIG. 2 with a radioactive decay compensation means.

Referring then to FIG. 5, an electronic watch is shown which is similar to the electronic watch described with respect to FIG. 2. In this embodiment, however, counter 17*a* is of the presettable type so that the number of counts which counter 17*a* goes through during any given counting cycle is governed by the n input to such counter. Counter 17*a* is preset to a value n which value is then decremented to 0. The 0 count is detected by gate 17*b* to provide an output pulse approximately once each second. The number of counts n to which counter 17*a* is preset in any given cycle is determined by the output of read-only memory (ROM) 48. The date of manufacture is permanently stored, in binary form, in a read-only type memory register 45. The stored date is compared to the present date provided by counters 18–22 and 46 of the timekeeping circuitry. Note that in this embodiment, a year counter 46 is included for determining the total lapsed time between the date, including year of manufacture, $T_{INIT}$, and the preset date, $T_{PRES}$. The comparison is performed in the logic circuitry 47 which may be comprised of a binary logic circuit which binarily subtracts the present date provided by registers 19, 20, 22 and 46 with the binary date of manufacture provided by register 45 to generate the lapsed time, $T_{LAPSED}$. A preselected number of the most significant bits of the calculated lapsed time, depending upon the degree of accuracy desired, are utilized to address ROM 48. The data, stored at the particular address of ROM 48, establishes the count n through which counter 17*a* cycles.

Other methods of compensating for the changing pulse rate produced by the radioactive energy source would simply entail adding a predetermined number of additional pulses during a predetermined period; that is, for example, where the radioactive energy source is tritium, the rate of change over a reasonable lifetime of an electronic watch embodying the present invention would be, for example, approximately one pulse per day; therefore, the counter 17 illustrated in FIG. 2 may be refreshed by approximately one pulse per day for each lapsed day to compensate for the decrease in rate. This latter method has the advantage of eliminating the necessity of ROM 48.

In the above-described preferred embodiment of the invention, a radioactive source is ion implanted into the depletion region of a P-N junction semiconductor device to provide a random timing source. Other semiconductor detector embodiments of the invention may alternately be utilized. For example, a Schottky device, such as Schottky diode, 52 illustrated in FIG. 7 may be provided in which the radioactive source 53 is implanted into the contact metallization, 54 typically palladium, to provide the radioactive timing source. In still a further embodiment, illustrated in FIG. 8 the radioactive material 55 is implanted into the gate contact 56 of MOS transistor 57 to provide the timing source. The signals provided by these devices are also detectable and may be amplified to provide the clock signal for the counting chain of an electronic timekeeping device, chronometer, or the like.

Although the invention has mainly been described as being embodied in horologic and chronographic instruments, the invention may also be utilzed as a time standard in applications which require long-term stability. An example of this type of application is a long-term stability frequency standard for SSB CB radios, radio telephones and the like, which corrects long-term drift associated with, for example, surface wave devices which have short-term stability. In other embodiments of the invention, the pulses generated by the timing source are utilized for clocking logic circuitry and the like in place or a crystal, RC, delay or other type of clock pulse generator.

Various embodiments of the invention have now been described in detail. Since it is obvious that many changes and modifications can be made in the above details without departing from the nature and spirit of the invention, it is understood that the invention is not to be limited to said details except as set forth in the appended claims.

What is claimed is:

1. An integrated circuit having a timing source incorporated therein for a timekeeping apparatus or the like, comprising:

(a) semiconductor substrate;

(b) a P-N junction device on one portion of said semiconductor substrate;

(c) A radioactive source incorporated in or near the depletion region of said P-N junction device, said radioactive source emitting beta particles that are absorbed by the depletion region of said P-N junction device, causing migration of electrons from the P to N region of said device, thereby creating electrical pulses across said device;

(d) circuit means for detecting said random electrical pulses across said P-N junction device, located on said substrate and coupled to said P-N junction device;

(e) circuit means for converting detected random electrical pulses to timing signals for generating a displayable indication of time and coupled to said circuit means for detection of random electrical pulses.

* * * * *